US012159495B2

(12) United States Patent
Oitate

(10) Patent No.: US 12,159,495 B2
(45) Date of Patent: Dec. 3, 2024

(54) VEHICLE DATA MANAGEMENT SYSTEM AND VEHICLE DATA MANAGEMENT METHOD

(71) Applicant: TOYOTA JIDOSHA KABUSHIKI KAISHA, Toyota (JP)

(72) Inventor: Chihiro Oitate, Kawasaki (JP)

(*) Notice: Subject to any disclaimer, the term of this patent is extended or adjusted under 35 U.S.C. 154(b) by 320 days.

(21) Appl. No.: 17/704,545

(22) Filed: Mar. 25, 2022

(65) Prior Publication Data

US 2022/0319252 A1 Oct. 6, 2022

(30) Foreign Application Priority Data

Mar. 31, 2021 (JP) ................................ 2021-061232

(51) Int. Cl.
*G07C 5/08* (2006.01)
*G07C 5/00* (2006.01)

(52) U.S. Cl.
CPC ............ *G07C 5/085* (2013.01); *G07C 5/008* (2013.01)

(58) Field of Classification Search
None
See application file for complete search history.

(56) References Cited

U.S. PATENT DOCUMENTS

2009/0058995 A1 3/2009 Yamashita
2015/0310676 A1* 10/2015 Lambert .................. G08G 1/16 709/204
2018/0261020 A1* 9/2018 Petousis ............... G07C 5/0841
2022/0169282 A1* 6/2022 Gan .................. B60W 60/0015
2023/0311936 A1* 10/2023 Park ..................... G07C 5/0841 701/23

FOREIGN PATENT DOCUMENTS

JP 2009-076050 A 4/2009
JP 2019-040364 A 3/2019

* cited by examiner

*Primary Examiner* — Jaime Figueroa
*Assistant Examiner* — Jerrod Irvin Davis
(74) *Attorney, Agent, or Firm* — Oliff PLC

(57) ABSTRACT

A vehicle collects various data in a first period before time of an occurrence of a predetermined event and various data in a second period after the time of the occurrence and creates a data set for uploading to an external server. The predetermined event includes first and second events to be uploaded indicating events to be uploaded. In the creation of the data set, it is determined whether an overlapping period exist in which a part of the first period overlaps with the second period between the events to be uploaded. If it is determined that the overlapping period exists, priority is compared. If the priority of the first event to be uploaded is lower than that of the second event to be uploaded, various data in the overlapping period is excluded from the data set of the former.

5 Claims, 10 Drawing Sheets

INS

| GROUP ID | EVENT ID | EVENT NAME | PRIORITY PL | EVENT JUDGEMENT On/Off | UPLOAD JUDGEMENT On/Off |
|---|---|---|---|---|---|
| GI1 | EI1 | EN1 | 4 | On | On |
| | EI2 | EN2 | 3 | Off | Off |
| GI2 | EI3 | EN3 | 3 | On | On |
| | EI4 | EN4 | 2 | On | Off |
| | EI5 | EN5 | 1 | On | Off |
| ⋮ | ⋮ | ⋮ | ⋮ | ⋮ | ⋮ |
| GIm | EIn | ENn | 5 | On | Off |

*FIG. 2*

VEHICLE DATA MANAGEMENT SYSTEM AND VEHICLE DATA MANAGEMENT METHOD

The present application claims priority under 35 U.S.C. § 119 to Japanese Patent Application No. 2021-061232, filed Mar. 31, 2021, the contents of which application are incorporated herein by reference in their entirety.

TECHNICAL FIELD

The present disclosure relates to a system and a method in an external server for managing various data acquired by a vehicle.

BACKGROUND

JP2019-040364A discloses a system for transmitting vehicle data to an external server in response to an occurrence of an event such as a collision, an operation of an automatic break, etc. In this conventional system, the vehicle data acquired before and after the occurrence of the event is stored in a predetermined area of a memory device mounted in the vehicle. The predetermined area is allocated in advance depending on the variety of the event. The conventional system also read the vehicle data from the memory device and transmit it to the external server. The external server calculates an occurrence frequency of the event for each type of the event based on this vehicle data. The external server also adjusts a capacity of the predetermined area based on the occurrence frequency and transmits information on the adjusted capacity to the vehicle.

In the conventional system, consider a case where two events occur at the same time. In this instance, the vehicle data before and after the occurrence of the event occurring earlier and that of the event occurring later are stored in the memory device. In this case, there is a high possibility that a part of the vehicle data overlaps between the event occurring earlier and that occurring later. When a part of the vehicle data is duplicated, it may take a long time to transmit all vehicle data to the external server. In addition, the transmission of the duplicate vehicle data may compress a bandwidth, causing the transmission of other data by the vehicle to be delayed.

One objective of the present disclosure is to provide a technique capable of preventing the transmission of the duplicate data from being transmitted when various data acquired when two or more events occur at the same time is transmitted from the vehicle to the external server.

SUMMARY

A first aspect is a system in an external server for managing various data acquired by a vehicle and has the following features.

The vehicle is configured to execute processing to collect various data in a first period before time of an occurrence of a predetermined event and various data in a second period after time of the occurrence of the predetermined event while the vehicle is running and to create a data set for uploading to the external server.

The predetermined event includes first and second events to be uploaded indicating events to be uploaded. A priority is set for each of the first and second events to be uploaded.

In the create processing the vehicle is configured to: determine whether there is an overlapping period in which at least a part of the first period overlaps with the second period between the first and second events to be uploaded; if it is determined that overlapping period exists, the priority is compared between the first and second events to be uploaded; and if the priority of the first event to be uploaded is lower than that of the second event to be uploaded, exclude various data collected in the overlapping period from the data set for the first event to be uploaded.

A second aspect further has the following features in first aspect:

In the create processing the vehicle is configured to:

- if the priority of the first event to be uploaded is equal to that of the second event to be uploaded, compare a time of an occurrence in these events; and
- if the time of the occurrence of the first event to be uploaded is prior to that of the second event to be uploaded, exclude various data collected in the overlapping period from the data set for the first event to be uploaded.

A third aspect further has the following features in the first aspect.

The vehicle is further configured to:

- execute processing to create an occurrence information of the predetermined event occurred while the vehicle running; and
- execute processing to upload the occurrence information to the external server.

The external server is configured to execute processing to store the data set for the first and second events to be uploaded in a memory device based on the occurrence information and the data set uploaded from the vehicle.

The occurrence information includes data of the time of the occurrence of the predetermined event.

In the storage processing of the data set for the first and second events to be uploaded the external server is configured to:

- based on the data of the time of the occurrence of the first and second events to be uploaded and the first and second period, determine whether the overlapping period exist; and
- if it is determined that the overlapping period exists, based on one of data set for the first and second events to be uploaded, interpolate the other data set for the first and second events to be uploaded.

A fourth aspect further has the following features in the first aspect.

The vehicle is further configured to execute processing to upload the data set to the external server.

In the upload processing of the data set, the vehicle is configured to:

- compare the priority between the first and second events to be uploaded; and

If the priority of the first event to be uploaded is lower than that of the second event to be uploaded, execute the upload of the data set for the first event to be uploaded after that of the data set for the second event to be uploaded.

A fifth aspect further has the following features in the first aspect.

The vehicle is further configured to execute processing to upload the data set to the external server.

In the upload processing of the data set, the vehicle is configured to

- compare the priority between the first and second events to be uploaded; and
- if the priority of the first event to be uploaded is equal to that of the second event to be uploaded, compare a time of an occurrence in these events; and if the time of the occurrence of the first event to be uploaded is prior to that of the second event to be uploaded, upload the data set for the first event to be uploaded prior to that of the data set for the second event to be uploaded.

A sixth aspect is a method in an external server for managing various data acquired by a vehicle and has the following features.

The vehicle is configured to execute processing to collect various data in a first period before time of an occurrence of a predetermined event and various data in a second period after time of the occurrence of the predetermined event while the vehicle is running and to create a data set for uploading to the external server.

The predetermined event includes first and second events to be uploaded indicating events to be uploaded. A priority is set for each of the first and second events to be uploaded.

The create processing of the data set includes:

processing to determine whether there is an overlapping period in which at least a portion of the first period overlaps with the second period between the first and second events to be uploaded;

processing to compare the priority between the first and second events if it is determined that the overlapping period exists; and processing to exclude the various data collected in the overlapping period from the data set for the first event to be uploaded if the priority of the first event to be uploaded is lower than that of the second event to be uploaded.

According to the first or sixth aspect, when it is determined that the overlapping period exists, the priority is compared between the first and second events to be uploaded. Then, duplicate data is excluded from the data set of the predetermined event with a lower priority. This eliminates the duplication of a part of the data set. Therefore, it is possible to suppress the occurrence of the problem that a long time is required to complete the transmission of the data set. In addition, it is possible to reduce the delay in transmitting the data other than the data set.

According to the second aspect, if the priority of the first event to be uploaded is equal to that of the second event to be uploaded, the data set of the predetermined event occurring later is created whereas the duplicate data is excluded from the data set of the predetermined event occurring earlier. Therefore, it is possible to upload the data set of the event occurring later that seems to contain more critical data to the external server in a non-abbreviated manner.

According to the third aspect, the occurrence information is created and uploaded to the external server. Therefore, it is possible to interpolate the duplicate data easily in the create processing of the data set for the first and second events to be uploaded executed in the external server.

According to the fourth aspect, it is possible to upload the data set of the predetermined event having a relatively high priority earlier.

According to the fifth aspect, if there are the predetermined events having equivalent priority, it is possible to the data set of the predetermined event having earlier the time of the occurrence to the external server earlier.

BRIEF DESCRIPTION OF DRAWINGS

FIG. 2 is a diagram showing an example of a collection instruction transmitted from an external server to a vehicle;

DESCRIPTION OF EMBODIMENT

Figure 1:
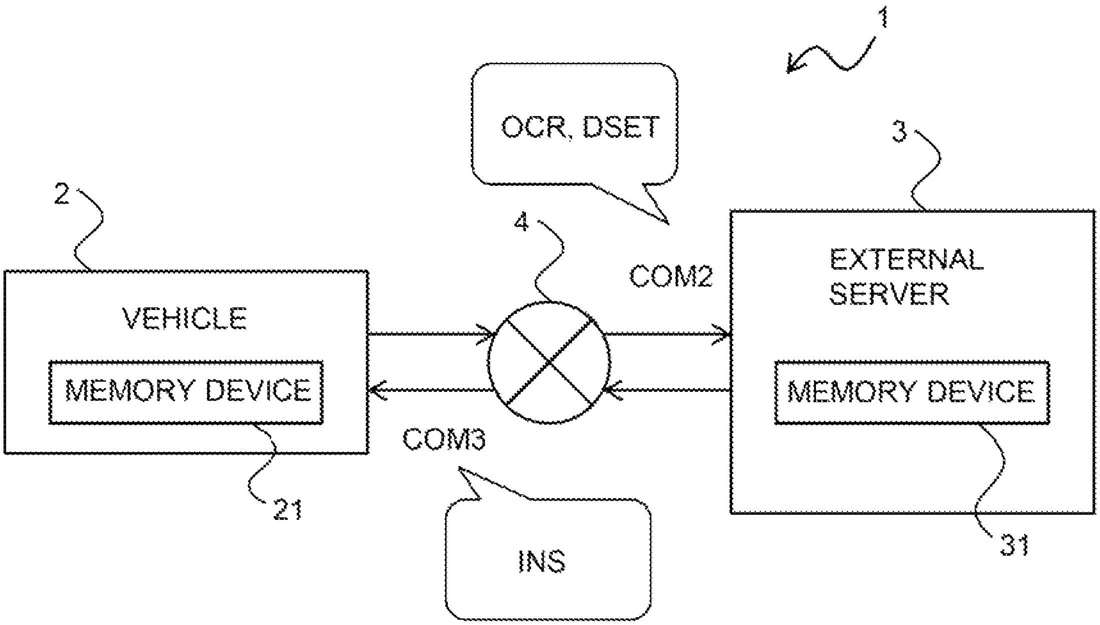
FIG. 1 is a diagram for explaining an outline of a data management according to an embodiment.

Hereinafter, with reference to the drawings, a vehicle data management system (hereinafter, simply referred to as a "management system") and a vehicle data management method according to an embodiment of the present disclosure will be described. Note that the vehicle data management method according to the embodiment is realized by computer processing executed in the management system according to the embodiment. In the drawings, the same or corresponding portions are denoted by the same sign, and descriptions thereof are simplified or omitted.

1. Outline of Embodiment

1-1. Data Management

FIG. 1 is a diagram for explaining an outline of a data management according to an embodiment. A vehicle data management system 1 shown in FIG. 1 includes a vehicle 2 and an external server 3. A communication between the vehicle 2 and the external server 3 takes place via a network 4. In this communication, communication data COM2 is transmitted from the vehicle 2 to the external server 3. The communication data COM2 is stored in a memory device 31 of the external server 3. On the other hand, the external server 3 transmits communication data COM3 to the vehicle 2. The communication data COM3 is stored in a memory device 21 of the vehicle 2.

Examples of the communication data COM2 include occurrence information OCR and a data set DSET of a predetermined event PE generated during the running of the vehicle 2. The data set DSET is a set of various data to be collected when a predetermined event PE (more precisely, a event to be uploaded UTE) occurs. The collection of the predetermined event PE is performed by the vehicle 2 using the occurrence of the predetermined event PE as a trigger. The event to be uploaded UTE is an event included in the predetermined event PE that needs to be uploaded to the external server 3. Details of the occurrence information OCR and the data set DSET will be described later.

Example of the communication data COM3 include a collection instruction INS. According to the collection instructions INS, the predetermined event PE or the like is specified. The collection instructions INS is provided from the external server 3 to the vehicle 2 at a predetermined time of day (e.g., a timing at which an ignition of the vehicle 2 is turned on). Original data of the collection instructions INS is stored in a memory device of the external server 3. Content of this original data is updated by the external server 3.

FIG. 2 is a diagram showing an example of the collection instruction INS. In the example shown in FIG. 2, the collection instructions INS includes items of a group ID, an event ID, an event name, an event judgement On/Off, a priority, and an upload judgement On/Off. The collection instructions INS may include items other than these items. Examples of the other items include a pattern to acquire various data and a list of points (e.g., latitude and longitude data) to acquire the various data.

The group ID is an item to identify a group to which the predetermined event PE belongs. In the example shown in FIG. 2, GI1, GI2 and GIm ("m" is a natural number of 3 or more) are set as the group ID. GI1 is, for example, an ID for the group relating to a drive of the vehicle 2. GI2 is, for example, the ID for the group relating to an external recognition by the vehicle 2. GIm is, for example, the ID for the group relating to the occurrence of an abnormality in various systems mounted on the vehicle 2.

The event ID is an item to identify the predetermined event PE. In the examples shown in FIG. 2, EI1 and EI2 are set as the event ID of GI1. EI1 is, for example, the ID indicating an acceleration or a deceleration of the vehicle 2. EI2 is, for example, the ID indicating that a drive transition demand (TD: Transition Demand) is detected. As the event ID of GI2, EI3 to EI5 are set. EI3 is, for example, the ID indicating a misrecognition. EI4 is, for example, the ID indicating that clouds are detected. EI5 is, for example, the ID indicating that raindrops are detected. As the event ID of GIm, EIn is set ("n" is a natural number greater than or equal to 3). For example, EIn is the ID indicating that an error signal is detected.

The even-name EN is the item that indicates a content of the predetermined event PE. In the example shown in FIG. 2, EN1 to EIN are set as the event name EN. EN1 to ENn correspond to EI1 to EIn, respectively.

The priority PL indicates a priority of collecting data collected when the predetermined event PE occurs and the priority of uploading of the collected data to the external server 3. In the example shown in FIG. 2, the priority PL is divided into five stages from 1 to 5. The higher the number of the priority PL, the higher the priority is given to data collection of the predetermined event PE. The higher the number of the priority PL, the higher the priority for uploading the collected data of the predicted event PE.

The event judgement On/Off is the item indicating whether the predetermined event PE is treated as an event to be collected CTE. The event to be collected CTE is an event included in the predetermined event PE that needs to be stored in the memory device 21. The predetermined event PE of which the event determination is "On", the event is treated as the event to be collected CTE. The predetermined event PE of which the event determination is "Off", the event is not treated as the event to be collected CTE.

The upload judgement On/Off is the item indicating whether the predetermined event PE is treated as the event to be uploaded UTE. The predetermined event PE of which the upload judgement is "On" is treated as the event to be uploaded UTE. The predetermined event PE of which the upload judgement is "Off" is not treated as the event to be uploaded UTE.

As can be seen from comparing the items of the upload judgement On/Off with the items of the event judgement On/Off, there is the predetermined event PE of which the event determination is "On" and the upload judgement is "Off". Various data which is collected in response to an occurrence of such the predetermined event PE will not be uploaded to the external server 3.

1-2. Processing Executed when the Predetermined Event PE Occurs

Figure 3:
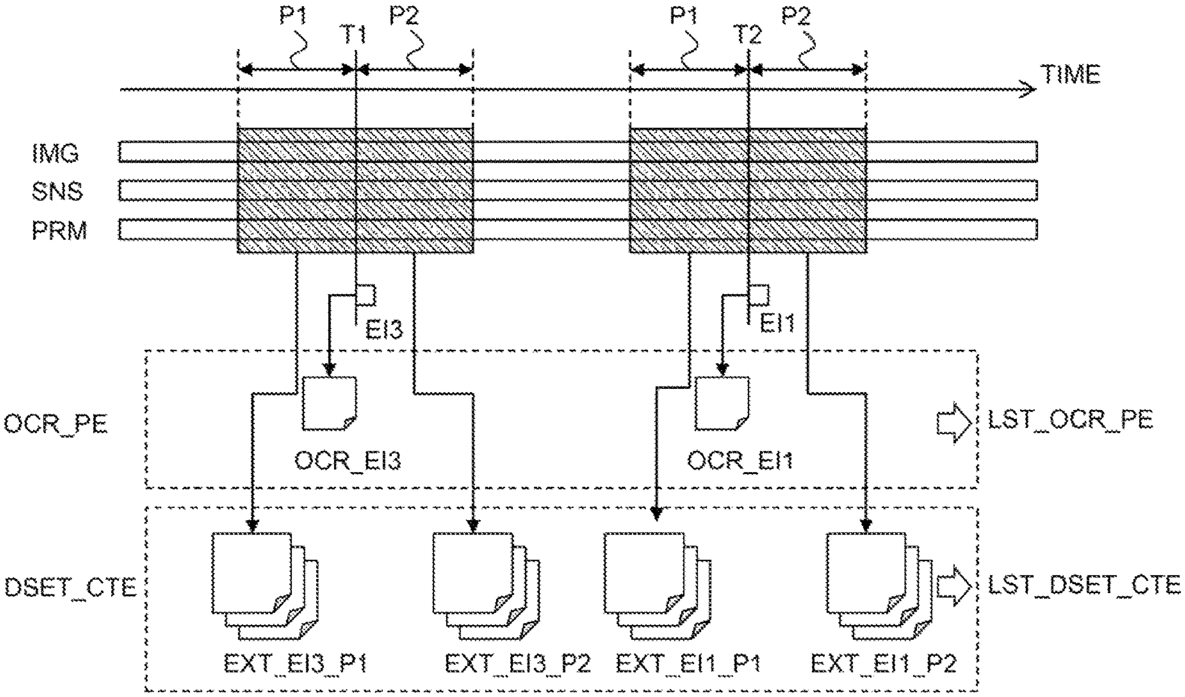
FIG. 3 is a diagram for explaining an outline of processing when an event to be collected occurs.

FIG. 3 is a diagram for explaining processing executed when the predetermined event PE occurs. The vehicle 2 detects the occurrence of the predetermined event PE. If the occurrence of the predetermined event PE is detected, the vehicle 2 creates this occurrence information OCR_PE. The data of the occurrence information OCR_PE includes data of the event ID of the predetermined event PE and the data of time of the occurrence (e.g., time stamp). Note that the occurrence information OCR_PE may further include data of a travel distance of the vehicle 2 up to the time of the occurrence of the predetermined event PE.

According to the occurrence information OCR_PE, it becomes possible to upload to the external server 3 the information on the occurrence of the predetermined event PE having the upload judgement "Off" and the event determination is "On". It is also possible to upload to the external server 3 the information on the occurrence of the predetermined event PE of which the event determination is "Off". The information on the occurrence of the predetermined event PE uploaded to the external server 3 is used for updating the items of the event judgement On/Off and the upload judgement On/Off.

In the case shown in FIG. 3, the predetermined event PE of which the event ID is EI3 occurs at time T1. The predetermined event PE of which the event ID is EI1 occurs at time T2. Note that the predetermined event PE of which the event ID is EI3 and that of which the event ID is EI1 correspond to the predetermined event PE of which the event determination is "On" (i.e., the event to be collected CTE) (see FIG. 2).

An occurrence information OCR_EI3 of the predetermined event PE of which the event ID is E3 and an occurrence information OCR_EI1 of which the event ID is EI1 are listed and stored in the memory device 21. Upon the upload on the external server 3, the memory device 21 reads a list LST_OCR_PE of the occurrence information OCR_PE and transmits to the external server3.

If the predetermined event PE that occurred corresponds to the event to be collected CTE, processing to create the data set DSET_CTE of the event to be collected CTE is executed. The created data set DSET_CTE is stored in the memory device 21. The create processing of the data set DSET_CTE is executed after or in parallel with generation processing of the occurrence information OCR_PE. In the create processing of the data set DSET_CTE, cache of the various data (i.e., temporarily stored data) is extracted in reference to the time of the occurrence of event to be collected CTE.

Examples of the various data to be extracted include image data IMG, sensor data SNS and parameter data PRM. The image data IMG is data acquired by a camera of the vehicle 2. The sensor data SNS is data acquired by various sensors (an internal sensor and an external sensor) of the vehicle 2. The parameter data PRM is data of parameters used for various control of the vehicle 2. The cache of the extracted various data is collectively referred to as "extracted data EXT_CTE".

A duration to extract the extracted data EXT includes a first period P1 before the time of the occurrence (i.e., time T1 and time T2) and a second period P2 after this time of the occurrence. A length of the first period P1 and that of the second period P2 is, for example, 5 to 15 seconds.

In the example shown in FIG. 3, an extracted data EXT_EI3_P1 as the extracted data EXT_CTE is generated from the cache of the various data in the first period P1 prior to time T1. An extracted data EXT_EI3_P2 as the extracted data EXT_CTE is also generated from the cache of the various data in the second period P2 after time T1. Similarly, extracted data EXT_EI1_P1 and EXT_EI1_P2 are generated before and after time T2.

The extracted data EXT_EI3_P1 and EXT_EI3_P2 constitute the data set DSET_CTE of the predetermined event PE of which event ID is EI3. The extracted data EXT_EI1_P1 and EXT_EI1_P2 constitute the data set DSET_CTE of the predetermined event PE of which event ID is EI1. The data names of the various data included in this data set DSET_CTE are listed. A list LST_DSET_CTE of the data names is stored in the memory device 21.

If the predetermined event PE that occurred corresponds to the event to be uploaded UTE, processing to create data set DSET_UTE of the event to be uploaded UTE is also executed. The create processing of the data set DSET_UTE is executed in parallel with the create processing of the data set DSET_CTE. The create processing of the data set DSET_UTE is explained by replacing the "event to be collected CTE" "in the explanation to FIG. 3 with the "event to be uploaded UTE.

Note that the predetermined event PE of which the event ID is EI1 and the predetermined event PE of which the event ID is EI3 correspond to the predetermined event PE of which the upload judgement is "On" (i.e., the event to be uploaded UTE) (see FIG. 2). Therefore, the predetermined event PE of which the event ID is EI1 corresponds to one of the "first and second events to be uploaded" in the present application. In addition, the predetermined event PE of which the event ID is EI3 corresponds to the other of the "first and second events to be uploaded" in the present application.

1-3. Improvement of Create Processing of Data Set DSET_UTE

Figure 4:
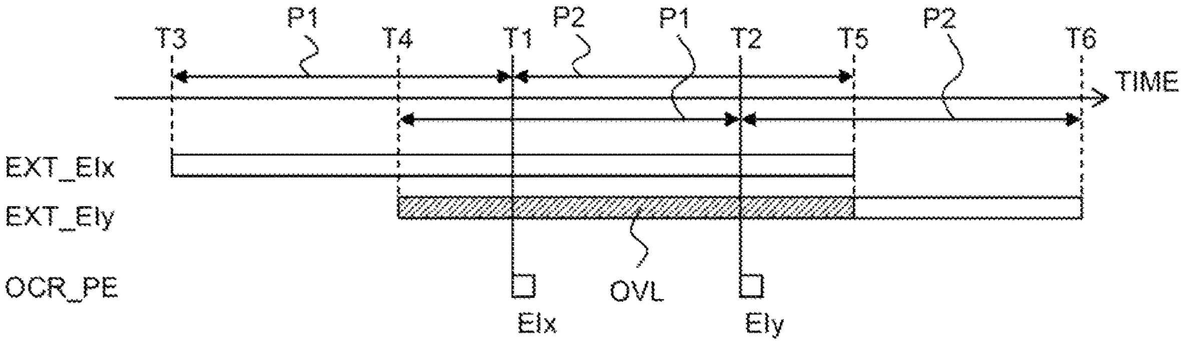
FIG. 4 is a diagram for explaining a problem in create processing of a dataset of the event to be uploaded.

FIG. 4 is a diagram for explaining a problem in the create processing of the data set DSET_UTE. In FIG. 4, the predetermined event PE of which the event ID is EIx (1≤x≤n) occurs at time T1. In addition, the predetermined event PE of which the event ID is EIy (1≤y≤n) occurs at time T2. Note that each of these predetermined events PE is assumed the predetermined event PE of which the upload judgement corresponds to "On" (i.e., the event to be uploaded UTE).

In a case shown in FIG. 4, the first period P1 overlaps with the second period P2 from time T1 to time T2. In addition, the second period P2 overlaps with the first period P1 before time T1. In addition, the first period P1 overlaps with the second period P2 after time T2. Therefore, there is an overlapping period OVL from time T4 to time T5.

If such the overlapping period OVL exists, the memory device 21 will contain the data set DSET_UTE in which a portion of the extracted data EXT_EIx overlaps with the extracted data EXT_EIy. However, reading this data set DSET_UTE from the memory device 21 and uploading it to the external server 3 may take a long time for all data set to be transmitted. In addition, the transmission of the duplicate data may compress a bandwidth, causing the transmission of other data by the vehicle 2 to be delayed.

Therefore, when another event to be uploaded UTE (e.g., the predetermined event PE of which the event ID is EI1) occurs during the crate processing of the data set DSET_UTE of an event to be uploaded UTE (e.g., the predetermined event PE of which the event ID is EI3), the management system according to the embodiment compares the priority PLs of these events to be uploaded UTE. And, based on the result of this comparison, the management system executes create processing to create data set DSET_UTE of two types of the events to be uploaded UTE.

Figure 5:
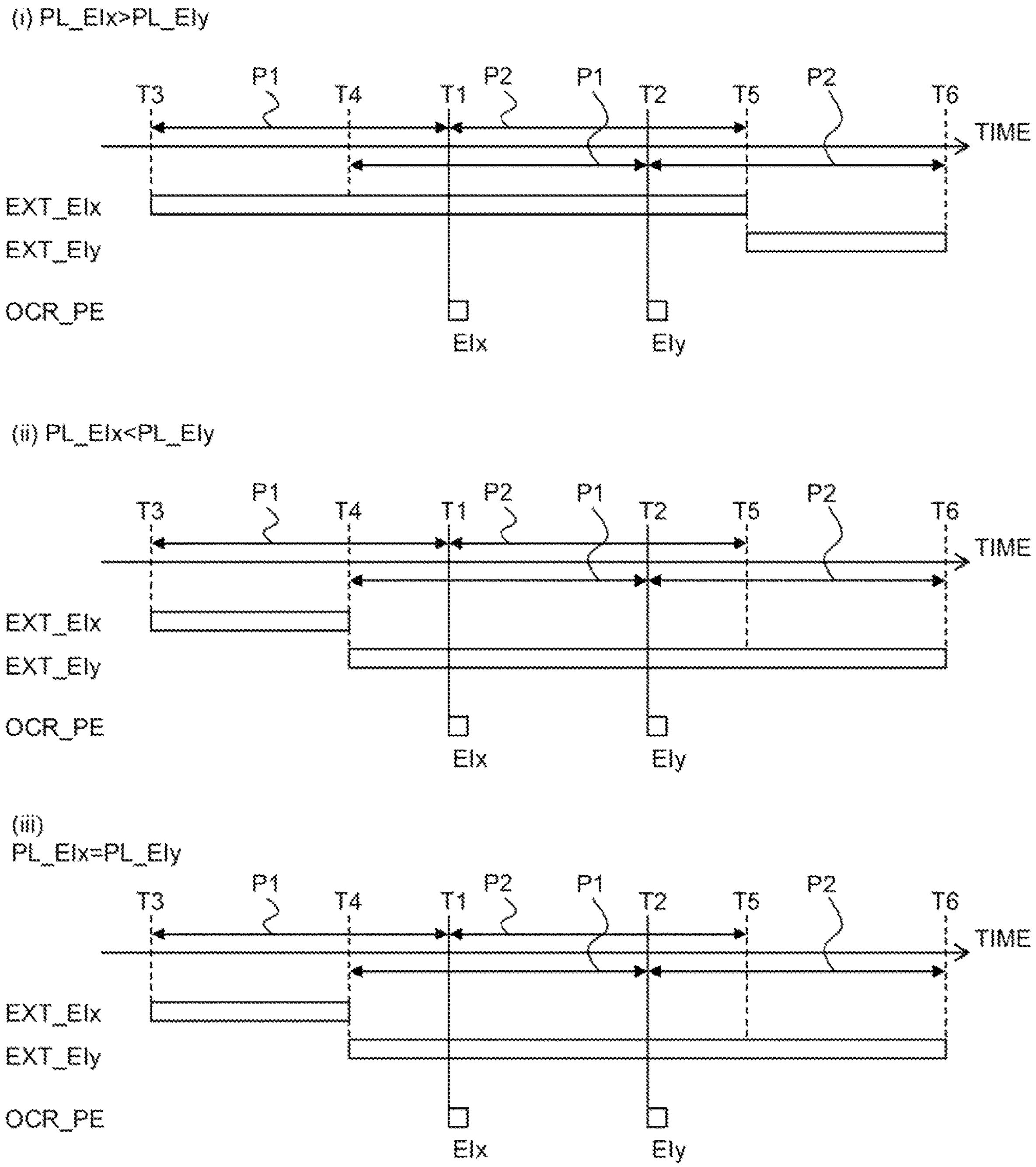
FIG. 5 is a diagram for explaining an improvement of the create processing of the dataset of the event to be uploaded.

FIG. 5 is a diagram for explaining an improvement of the create processing of the data set DSET_UTE. The generation status of the events to be uploaded UTE depicted in FIG. 5 is the same as that shown in FIG. 4. That is, in the examples shown in FIG. 5, the overlapping period OVL exists from time T4 to time T5. Note that the predetermined event PE of which the event ID is EIx corresponds to one of the "first and second events to be uploaded" in the present application. In addition, the predetermined event PE of which the event ID is EIy corresponds to the other of the "first and second events to be uploaded" in the present application.

There are three patterns corresponding to a magnitude relation between the priorities PL are drawn on FIG. 5. FIG. 5 (i) shows an example of the create processing in which the predetermined event PEs of which the event IDs are EIx and EIy, and the priority PL_EIx is higher than the priority PL_EIy (PL_EIx>PL_EIy). FIG. 5 (ii) shows an example of the create processing in which the predetermined event PEs of which the event IDs are EIx and EIy, and the priority PL_EIx is lower than the priority PL_EIy (PL_EIx<PL_EIy). FIG. 5 (ii) shows an example of the create processing in which the predetermined event PEs of which the event IDs are EIx and EIy, and the priority PL_EIx is equal to the priority PL_EIy (PL_EIx=PL_EIy).

In the example shown in FIG. 5 (i), the data set DSET_UTE is created in response to the occurrence of the predetermined event PE of which the event ID is EIx. The creation of the data set DSET_UTE of the predetermined event PE of which the event ID is EIx is executed by extracting the various data from time T3 to time T5. The creation of the data set DSET_UTE of the predetermined event PE of which the event ID is EIy is executed by extracting the various data from time T5 to time T6. Consequently, the extracted data EXT_EIx is composed of the data from time T3 to time T5. On the other hand, the extracted data EXT_EIy is composed of the data from time T5 to time T6.

Even in the example shown in FIG. 5 (ii), the data set DSET_UTE is created in response to the occurrence of the predetermined event PE of which the event ID is EIx. However, the creation of the data set DSET_UTE of the predetermined event PE of which the event ID is EIx is aborted in response to the detection of the occurrence of the predetermined event PE of which the event ID is EIy. Instead, the creation of the data set DSET_UTE of the predetermined event PE of which the event ID is EIy is executed.

The creation of the data set DSET_UTE of the predetermined event PE of which the event ID is EIy is executed by extracting the various data from time T4 to time T6. The data from time T4 to time 12 is deleted from the data set DSEI_UTE of the predetermined event PE of which the event ID is EIx. Consequently, the extracted data EXT_EIx is composed of the data from time T3 to time T4. On the other hand, the extracted data EXT_EIy is composed of the data from T4 to time T6.

Like the example shown in FIG. 5 (ii), in the example shown in FIG. 5 (iii), the creation of the data set DSET_UTE of the predetermined event PE of which the event ID is EIx is aborted in response to the detection of the occurrence of the predetermined event PE of which the event ID is EIy. Instead, the creation of the data set DSET_UTE of the predetermined event PE of which the event ID is EIy is executed. The reason for creating the data set DSET_UTE of the predetermined event PE of which the event ID is EIy is that an event occurring later often yields more important data than the event occurring earlier. Consequently, both extracted data EXT_EIx and EXT_EIy are the same as those of in the example shown in FIG. 5 (ii).

As described above, according to the management system, when the overlapping period OVL exists, each priority PL of the events to be uploaded UTE is compared. Then, the data set DSET_UTE of the event to be uploaded of which the priority PL is higher is created whereas the duplicate data is excluded from the data set DSET_UTE of the event to be uploaded of which the priority PL is lower. Therefore, it is possible to suppress the occurrence of the above-described problem.

Hereinafter, the management system according to the embodiment will be described in detail.

2. Vehicle Data Management System

2-1. Configuration Example of Vehicle

Figure 6:
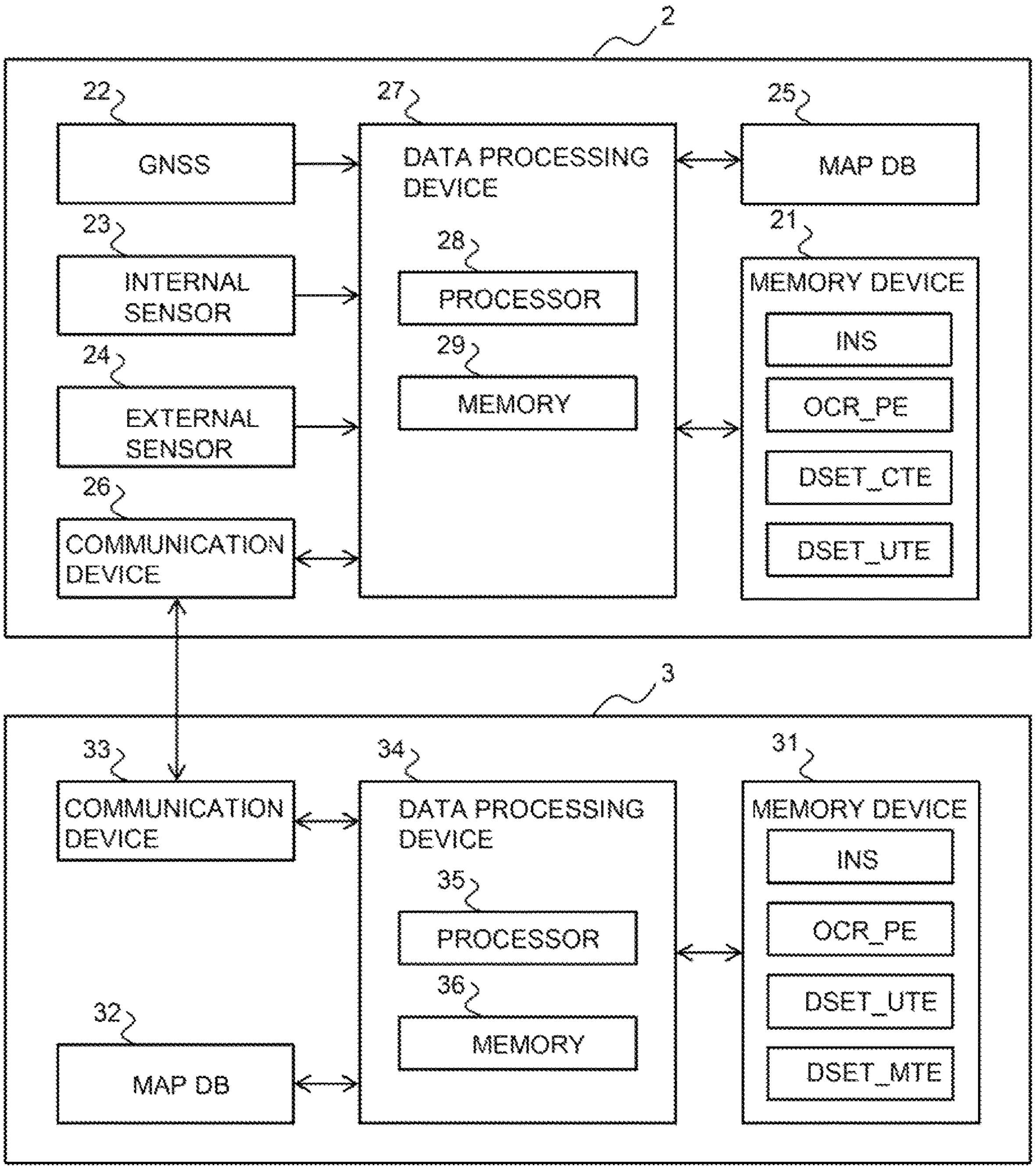
FIG. 6 is a block diagram showing a configuration example of the vehicle and external server.

FIG. 6 is a block diagram showing a configuration example of the vehicle and external server. As shown in FIG. 6, the vehicle 2 includes the memory device 21, a GNSS (Global Navigation Satellite System) device 22, an internal sensor 23, an external sensor 24, a map database (a map DB) 25, a communication device 26, and a data processing device 27. The data processing device 27 and the elements such as the memory device 21 are connected, for example, by a network mounted on the vehicle 2 (e.g., a CAN (Controller Area Network)).

The memory device 21 is a non-volatile memory such as a hard disk and a flash memory. The memory device 21 stores the collection instruction INS, the occurrence information OCR_PE, the data set DSET_CTE, and the data set DSET_UTE. The memory device 21 may store the occurrence information OCR_PE as the listing LST_OCR_PE. The memory device 21 also stores the lists of the data names LST_DSET_CTE and LST_DSET_UTE. Note that the list LST_DSET_UTE is a list of names of the various data included in the data set DSET_UTE.

The GNSS device 22 is a device for receiving signals from three or more artificial satellites. The GNSS device 22 acquires location data of the vehicle 2 (specifically, the latitude data and longitude data; the same shall apply hereinafter). The GNSS device 22 calculates position and orientation (gearing) of the vehicle 2 based on the received signals. The GNSS device 22 transmits the position and orientation data to the data processing device 27.

The internal sensor 23 acquires data about a driving status of the vehicle 2. Examples of the internal sensor 23 include a wheel speed sensor, an acceleration sensor, a yaw rate sensor, and a steering angle sensor. The wheel speed sensor detects rotational velocity per unit-time of each wheel of the vehicle 2. The acceleration sensor detects an acceleration of the vehicle 2. The yaw rate sensor detects a yaw rate around a vertical axis of a center of gravity of the vehicle 2. The steering angle sensor detects a steering angle of a steering wheel. The internal sensor 23 transmits the retrieved data to the data processing device 27.

The external sensor 24 acquires data about a surrounding environment of the vehicle 2. Examples of the external sensor 24 include a camera, a millimeter wave radar, and a LIDAR (Laser Imaging Detection and Ranging). The millimeter wave radar uses millimeter wave to detect an object around the vehicle 2. The LIDAR detects an object around the vehicle 2 by using light. The camera captures an external condition of the vehicle 2. The external sensor 24 transmits the retrieved data to the data processing device 27.

The map database (the map DB) 25 stores map data. Examples of the map data include location data of a road, data of a shape of the road (e.g., types of curves and straight lines) and location data of an intersection and location data of a construction. The map data also includes data on traffic rules. The map database 25 is formed in a memory device mounted on the vehicle 2 (e.g., a hard disk, a flash memory). The map database 25 may be formed in a computer capable of communicating with the vehicle 2 (e.g., the external server 3).

The communication device 26 wirelessly communicates with a base station (not shown) of the network 4. Examples of the communication standard of this wireless communication include a mobile communication standard such as 4G, LTE, and 5G. A connection point of the communication device 26 includes the external server 3. In the communication with the external server 3, the communication device 26 transmits to the external server 3 the communication data COM2 received from the processing device 27.

The data processing device 27 is a computer to process various data. The data processing device 27 includes, for example, a microcomputer having at least one processor 28 and at least one memory 29. The processor 28 includes a CPU (Central Processing Unit). The memory 29 is a volatile memory, such as a DDR memory, which develops a program used by the processor 28 and temporarily stores various data. The program stored in the memory 29 is read and executed by the processor 28 to realize various functions of the data processing device 27. The data processing example by the data processing device 27 will be described later.

2-2. Configuration Example of External Server

As shown in FIG. 6, external server 3 includes a memory device 31, a map database (Map-DB) 32, a communication device 33, and a data processing device 34. Elements such as the memory device 31 and the data processing device 34 are connected by a dedicated network.

The memory device 31 is a non-volatile memory such as a hard disk or a flash memory. The memory device 31 stores the collection instructions INS, the occurrence information OCR_PE, the data set DSET_UTE, and a data set DSET_MTE. The data set DSET_MTE is a data set of an event to be managed MTE created based on the data set DSET_UTE. The event to be managed MTE is the predetermined event PE that is managed in the external server 3. When the predetermined event PE occurs, a behavior of the vehicle 2 is verified by using the data set DSET_MTE. Create processing of the data set DSET_MTE will be described later.

The map database 32 is formed in a predetermined memory device (e.g., a hard disk, a flash memory). The map database 32 stores map data. An example of the map data is already described.

The communication device 33 wirelessly communicates with the base station of the network 4. Examples of the communication standard of this wireless communication include a mobile communication standard such as 4G, LTE, and 5G. A connection point of the communication device 33 includes the vehicle 2. In the communication with the vehicle 2, the communication device 33 transmits the communication data COM3 received from the data processing device 34.

The data processing device 34 is a computer to process various data. The data processing device 34 includes, for example, a microcomputer having at least one processor 35 and at least one memory 36. The processor 35 includes a CPU. The memory 36 is a volatile memory, such as a DDR memory, which develops a program used by the processor 35 and temporarily stores various data. The program stored in the memory 36 is read and executed by the processor 35 to realize various functions of the data processing device 34. The data processing example by the data processing device 34 will be described later.

Figure 7:
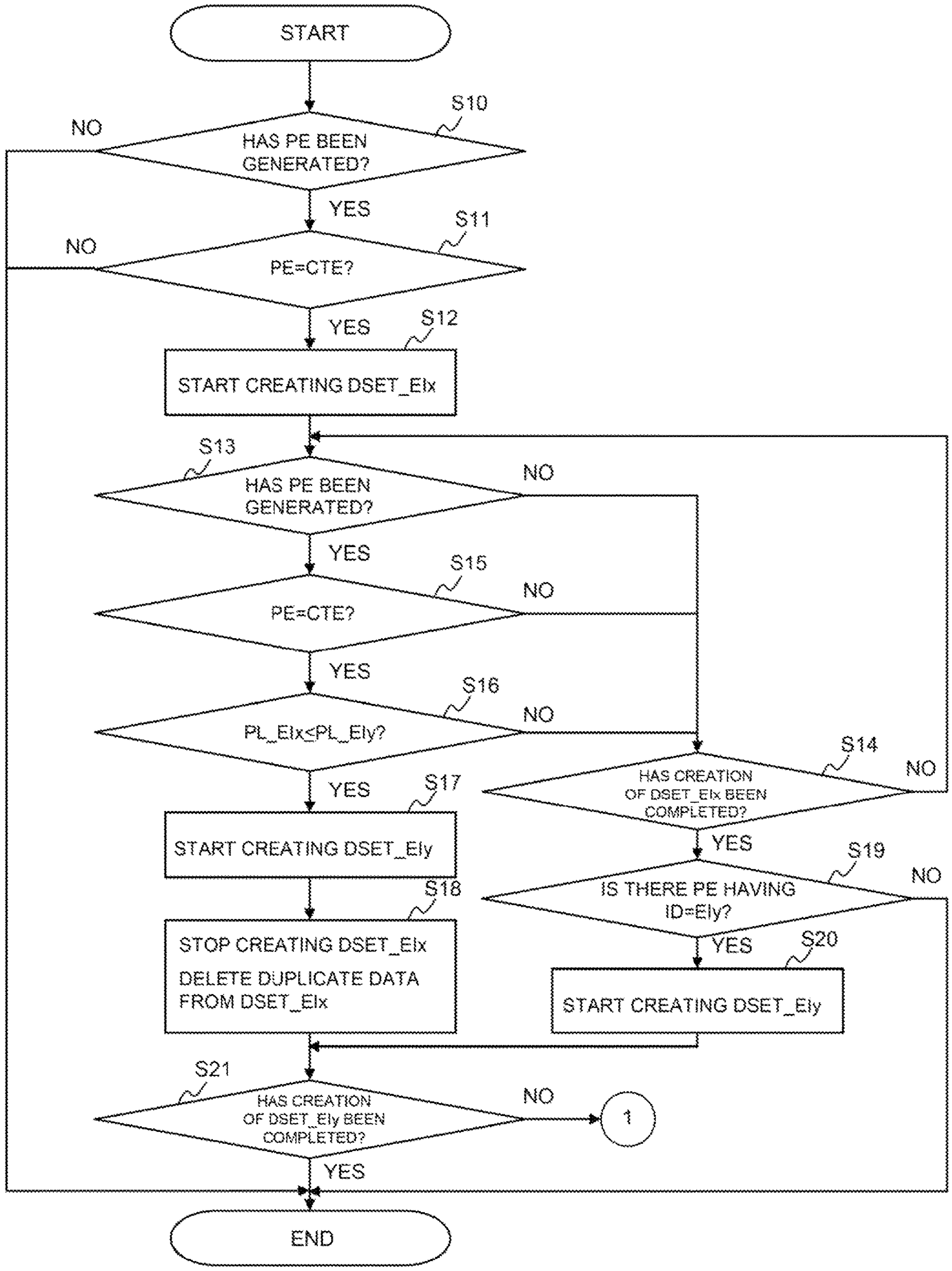
FIG. 7 is a f flowchart illustrating an example of processing executed in the vehicle when the dataset of the event to be collected is created.
Figure 8:
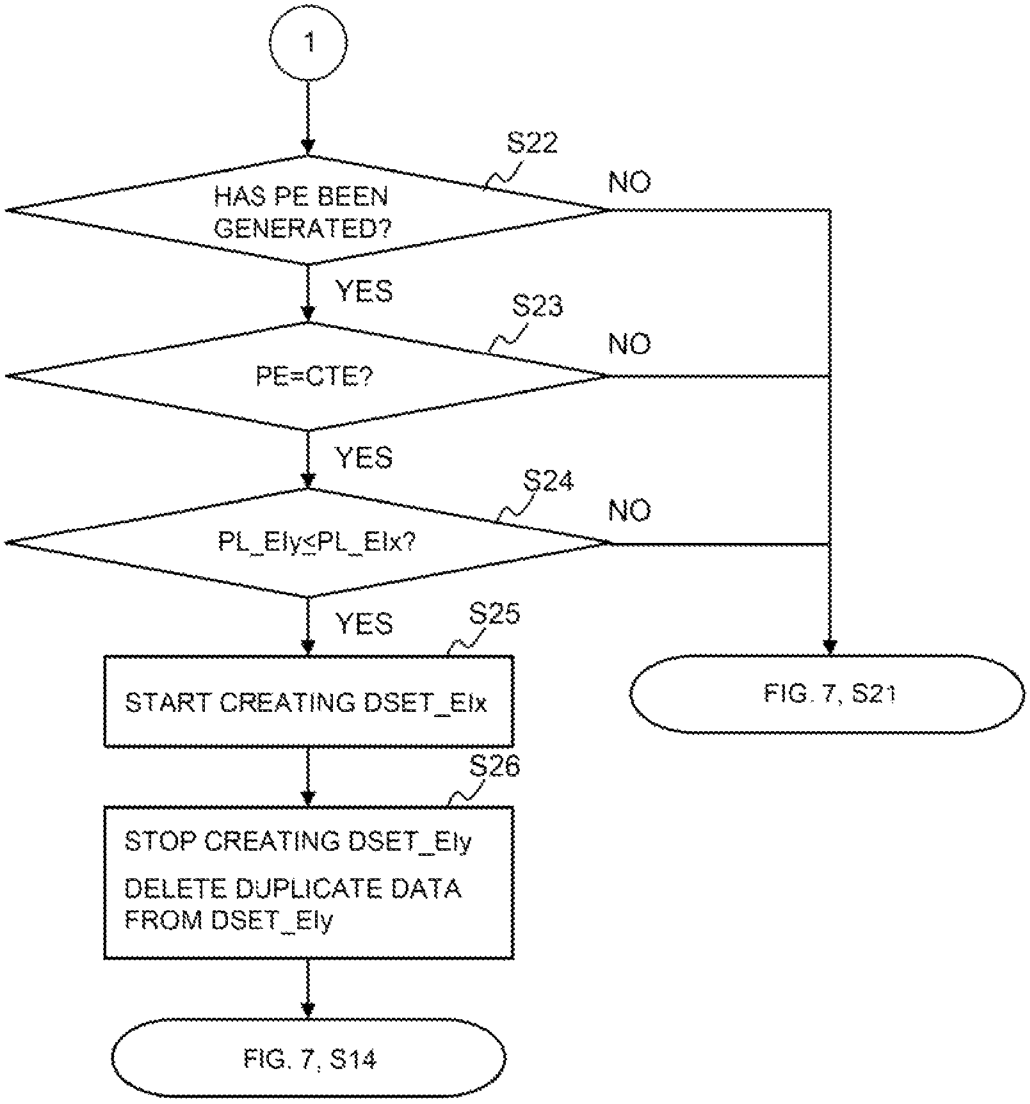
FIG. 8 is a f flowchart illustrating an example of processing executed in the vehicle when the dataset of the event to be collected is created.

2-3. Processing Example Executed by the Vehicle 2-3-1. Processing Example Executed in the Creation of Data Set FIGS. 7 and 8 are flowcharts illustrating an example of processing executed in the data processing device 27 (the processor 28) when the dataset DSET_CTE is created. The routine shown in FIGS. 7 and 8 a routine for creating the occurrence information OCR_PE and the data set DSET_CTE and is executed repeatedly at predetermined control cycle. Note that the routine for creating the DSET_UTE is explained by replacing the "events to be collected CTE" in the explanation to FIG. 7 and the "data set DSET_CTE" with the "events to be uploaded UTE" and the "data set DSET_UTE", respectively.

In the routines shown in FIGS. 7 and 8, first, it is determined whether the generation of the predetermined event PE has been detected (step S10). If the judgement result in the step S10 is positive, the occurrence information OCR_PE of the detected predetermined event PE is generated. For convenience of explanation, it is assumed that the event ID of the predetermined event PE detected in the processing of the step S10 is "EIx" (1≤x≤n). If the judgement result in the step S10 is negative, the processor 28 terminates the routine process.

If the judgement result in the step S10 is positive, it is determined whether the predetermined event PE corresponds to the events to be collected CTE (step S11). The judgment in the step S11 is executed by referring to the collection instructions INS based on the content of the predetermined event PE of which the event ID is EIx. If the judgement result in the step S11 is negative, the processor 28 terminates the routine process.

If the judgement result in the step S11 is positive, the creation of the data set DSET_EIx is started (step S12). Next, it is determined whether the predetermined event PE has been detected (step S13). If the judgement result in the step S13 is positive, the occurrence information OCR_PE of the detected predetermined event PE is generated. For convenience of explanation, it is assumed that the event ID of the predetermined event PE detected in the processing of the step S13 is "EIy" (1≤y≤n).

If the judgement result in the step S13 is negative, it is determined whether the creation of the data set DSET_EIx has been completed (step S14). If the judgement result in the step S14 is negative, the processor 28 executes the processing in the step S13. If the judgement result of step S14 is positive, the processing of step S19 is executed.

If the judgement result in the step S13 is positive, it is determined whether the predetermined event PE corresponds to the events to be collected CTE (step S15). The judgment in the step S15 is executed by referring to the collection instructions INS based on the content of the predetermined event PE of which the event ID is EIy. If the judgement result in the step S15 is negative, the processing of step S14 is executed.

If the judgement result in the step S15 is positive, it is determined whether the priority PL_EIx is less than or equal to the priority PL_EIy (step S16). If the judgement result in the step S16 is positive, the creation of the data set DSET_EIy is started (step S17). If the judgement result in the step S16 is negative, the processing of the step S14 is executed.

After the processing of the step S17, the processing of the step S18 is executed. In the processing in the step S18, the creation of the data set DSET_EIx is stopped. And the overlapping period OVL is calculated based on the time of the occurrence of the predetermined event PE of which the event ID is EIx and that of which the event ID is EIy, and the first period P1 and the second period P2. Then, the data (duplicate data) in the overlapping period OVL is deleted from the data set DSET_EIx that has already been created.

In the processing of the step S19, it is determined whether the predetermined event PE of which the event ID is EIy exists. The processing of the step S19 is processing to confirm the presence of the predetermined event PE of which the event ID is EIy, having the priority PL_EIy that is lower than the priority PL_EIx. If the judgement result in the step S19 is negative, the processor 28 terminates the routine process.

If the judgement result in the step S19 is positive, the creation of the data set DSET_EIy is started (step S20). After the processing in the step S20, it is determined whether the creation of the data set DSET_EIy has been completed (step S21). If the judgement result in the step S20 is positive, the processor 28 terminates the routine process. The process of the step S21 is also executed after the processing of the step S18.

If the judgement result in the step S21 is negative, it is determined whether the predetermined event PE has been detected (step S22). If the judgement result in the step S22 is negative, the processing of the step S21 is executed. If the judgement result in the step S22 is positive, the occurrence information OCR_PE of the detected predetermined event PE is generated. For convenience of explanation, it is assumed that the event ID of the predetermined event PE detected in the processing of the step S22 is "EIx" (1≤x≤n).

If the judgement result in the step S22 is positive, it is determined whether the predetermined event PE corresponds to the event to be collected CTE (step S23). The determination in the S23 is executed by referring to the collection instructions INS based on the content of the predetermined event PE of which the event ID is EIx. If the judgement result in the step S23 is negative, the processing of the step S21 is executed.

If the judgement result in the step S23 is positive, it is determined whether the priority PL_EIy is less than or equal to the priority PL_EIx (step S24). If the judgement result in the step S24 is positive, the creation of the data set DSET_EIx is started (step S25). If the judgement result in the step S24 is negative, the processing of the step S21 is executed.

After the processing of the step S25, the processing of the step S26 is executed. In the processing in the step S26, the creation of the data set DSET_EIy is stopped. And the overlapping period OVL is calculated based on the time of the occurrence of the predetermined event PE of which the event ID is EIx and that of which the event ID is EIy, and the first period P1 and the second period P2. Then, the data (duplicate data) in the overlapping period OVL is deleted from the data set DSET_EIy that has already been created. After the processing of the step S26, the processing of the step S14 is executed.

Thus, according to the routines shown in FIGS. 7 and 8, when both predetermined events occurring earlier PE and predetermined event occurring later PE correspond to the events to be collected CTE, the data set DSET_CTE is created based on the comparison result of the priority PL of these events.

2-3-2. Processing Example in the Upload of Data Set

Figure 9:
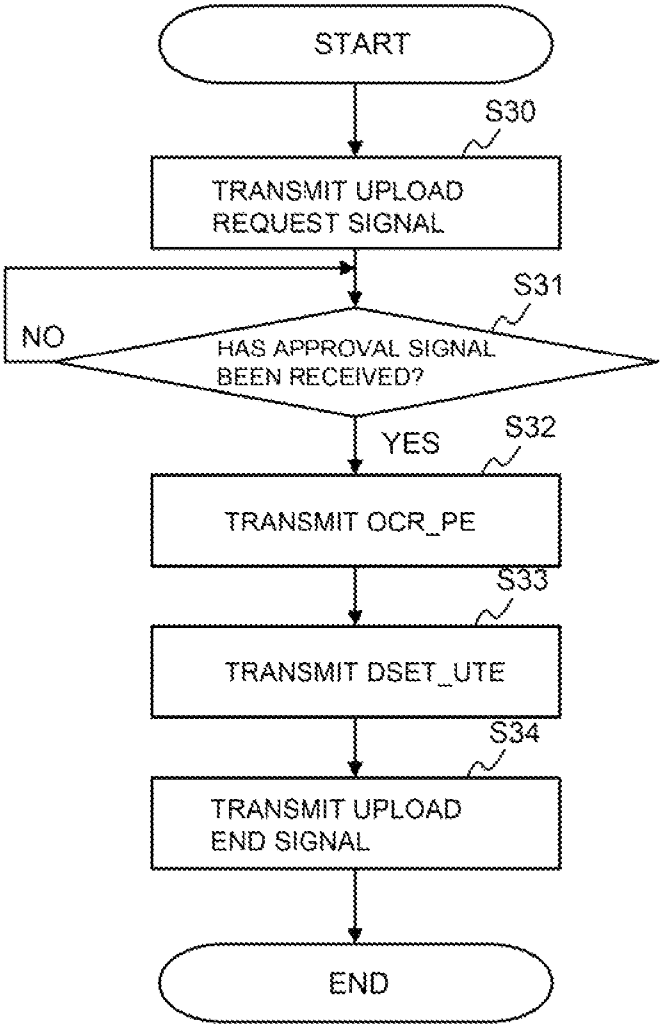
FIG. 9 is a flowchart illustrating an example of processing executed in the vehicle when the dataset of the event to be uploaded is uploaded to the external server.

FIG. 9 is a flowchart illustrating an example of processing executed by the data processing device 27 (the processor 28) when the data set DSET_UTE is uploaded to the external server 3. The routine shown in FIG. 9 is repeatedly executed at a predetermined control cycle.

In the routine shown in FIG. 9, first, an upload request signal is transmitted (step S30). Then, it is determined whether an approval signal has been received (step S31). The approval signal is a signal transmitted from the external server 3 in response to the upload request signal. The approval signal is waiting to be transmitted depending on a state of the external server 3. For example, if an amount of data in the memory device 31 exceeds a permissive amount, the approval signal is waited to be transmitted.

If the judgement result in the step S31 is positive, the occurrence information OCR_PE is transmitted (step S32). Subsequently, the data set DSET_UTE is transmitted (step S33). In the transmission of the occurrence information OCR_PE and the data set DSET_UTE, encoding processing is executed.

It is difficult to transmit a generation status of the predetermined event PE to the external server 3 when a problem such as a communication interruption occurs during the upload because the amount of data in the data set DSET_UTE is larger than that of the occurrence information OCR_PE. In this regard, in the processing in the steps S32 and S33, since the occurrence information OCR_PE is transmitted first and the data set DSET_UTE is transmitted later, it is possible to transmit reliably the generation status of the predetermined event PE to the external server 3.

In the processing of the step S33, the data set DSET_UTE is transmitted in order from the event UTE to be uploaded with higher priority PL. This is because the higher priority PL, the more external server 3 critical data set DSET is often the data set DSET_UTE. For the events UTE to be uploaded with equal priority PL, the data set DSET_UTE is transmitted in order of earlier time of occurrence. The reason for this is that if the amount of data in the memory device 21 exceeds the permissive amount and new data is recorded, the data with the earlier time of the occurrence is deleted.

Then, an upload end signal is transmitted when all the data set DSET_UTE have been transmitted (Step S34).

2-4. Processing Example Executed in the External Server

Figure 10:
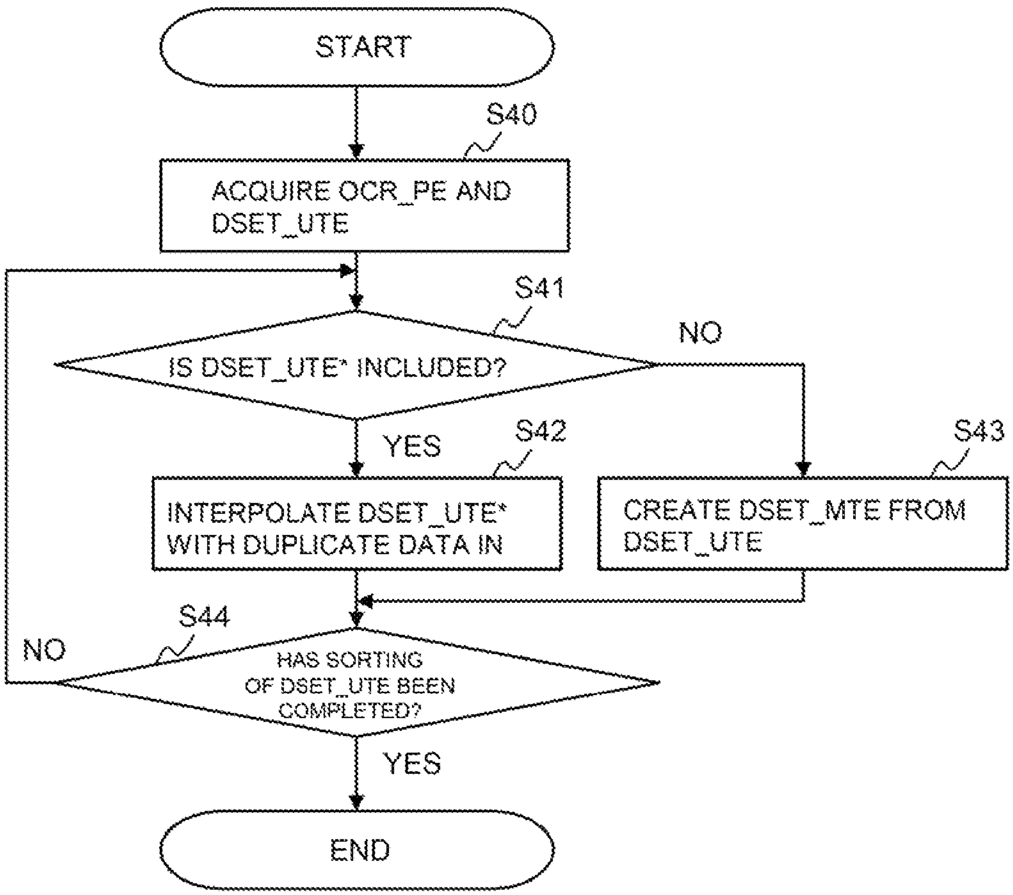
FIG. 10 is a flowchart illustrating an example of processing executed in the external server when the data set of a management event is created.

FIG. 10 is a flowchart illustrating an example of processing executed by the data processing device 34 (the processor 35) when the data set DSET_MTE is created. The routine shown in FIG. 10 is repeatedly executed at a predetermined control cycle.

In the routine shown in FIG. 10, first, the occurrence information OCR_PE and the data set DSET_UTE are acquired (step S40). For example, after receiving the upload end signal, the occurrence information OCR_PE and the data set DSET_UTE are acquired collectively. In the acquisition of the data, decoding processing of the occurrence information OCR_PE and the data set DSET_UTE is executed. In another instance, the memory device 31 stores the occurrence information OCR_PE and the data set DSET_UTE once and reads it therefrom, thereby the acquisition of the data.

After the processing of the step S40, it is determined whether data set DSET_UTE* is included in the data set DSET_UTE (step S41). The data set DSET_UTE* is the data set DSET_UTE in which the data is delated in the overlapping period OVL. The determination in the step S41 is executed, for example, based on the data of the time of the occurrence, the first period P1 and the second period P2 included in the occurrence information OCR_PE.

If the judgement result in step S41 is positive, the duplicate data in the data set DSE_UTE* is interpolated (restored) to create the data set DSET_MTE (step S42). The duplicate data is identified, for example, based on the data of the time of the occurrence included in the occurrence information OCR_PE and the listing LST_DSET_UTE. On the other hand, if the judgement result in the step S41 is negative, the data set DSET_MTE is created using the data set DSET_UTE (step S43).

After the processing in the step S42 or S43, it is determined whether a sorting of all the data set DSET_UTE has been completed (step S44). If the judgement result in the step S44 is negative, the processing of the step S41 is executed. On the other hand, if the judgement result in step S44 is negative, the processor 35 terminates the routine process.

3. Effects

As described above, according to the management system, when the overlapping period OVL exists, each priority PL of the events to be uploaded UTE is compared. Then, the data set DSET_UTE of the event to be uploaded of which the priority PL is higher is created whereas the duplicate data is excluded from the data set DSET_UTE of the event to be uploaded of which the priority PL is lower. Therefore, it is possible to suppress the occurrence of the above-described problem.

Further, according to the management system, when the priority PL of the event to be uploaded UTE occurring earlier is equal to that of the event to be uploaded UTE occurring later, the data set DSET_UTE of the latter is created whereas the duplicate data is excluded from the former. Therefore, it is possible to upload the data set DSET_UTE that seems to contain more critical data to the external server 3 without being omitted.

Further, according to the management system, the occurrence information OCR is created and uploaded to the external server 3. Therefore, the duplicate data can be easily interpolated in the external server 3 be executing the create processing of the data set DSET_MTE.

Further, according to the management system, it is possible to upload the data set DSET_UTE of the event to be uploaded UTE having higher priority PL to the external server 3 at an earlier timing. Furthermore, for the events to be uploaded UTE having equivalent priority PL, it is possible to upload the data set DSET_UTE of the event to be uploaded UTE having earlier the time of the occurrence to the external server 3 at an earlier timing.

What is claimed is:

1. A system comprising:

a vehicle comprising:

at least one sensor configured to execute processing to acquire various data in a first period before time of an occurrence of a predetermined event and various data in a second period after time of the occurrence of the predetermined event while the vehicle is running; and a processor configured to:

create a data set for uploading to an external server that manages the data acquired by the at least one sensor, wherein the predetermined event includes first and second events to be uploaded indicating events to be uploaded, and a priority is set for each of the first and second events to be uploaded, determine whether there is an overlapping period in which at least a part of the first period overlaps with the second period between the first and second events to be uploaded;

when it is determined that overlapping period exists, the priority is compared between the first and second events to be uploaded; and when the priority of the first event to be uploaded is lower than that of the second event to be uploaded, exclude various data collected in the overlapping period from the data set for the first event to be uploaded;

when the priority of the first event to be uploaded is equal to that of the second event to be uploaded, compare a time of an occurrence in these events;

when the time of the occurrence of the first event to be uploaded is prior to that of the second event to be uploaded, exclude various data collected in the overlapping period from the data set for the first event to be uploaded; and perform control to wirelessly transmit the data set to the external server, without the excluded data.

2. The system according to claim 1, the vehicle processor is further configured to:

execute processing to create an occurrence information of the predetermined event occurred while the vehicle running; and execute processing to upload the occurrence information to the external server, wherein the external server is configured to execute processing to store the data set for the first and second events to be uploaded in a memory device based on the occurrence information and the data set uploaded from the vehicle, wherein the occurrence information includes data of the time of the occurrence of the predetermined event, wherein, in the processing to store the data set for the first and second events to be uploaded, the external server is configured to:

based on the data of the time of the occurrence of the first and second events to be uploaded and the first and second period, determine whether the overlapping period exist; and when it is determined that the overlapping period exists, based on one of data set for the first and second events to be uploaded, interpolate the other data set for the first and second events to be uploaded.

3. The system according to claim 1, wherein the processor is further configured to:

execute processing to upload the data set to the external server, compare the priority between the first and second events to be uploaded; and when the priority of the first event to be uploaded is lower than that of the second event to be uploaded, execute uploading of the data set for the first event to be uploaded after that of the data set for the second event to be uploaded.

4. A system comprising:

a vehicle comprising:

at least one sensor configured to execute processing to acquire various data in a first period before time of an occurrence of a predetermined event and various data in a second period after time of the occurrence of the predetermined event while the vehicle is running; and a processor configured to:

create a data set for uploading to an external server that manages the data acquired by the at least one sensor, the predetermined event includes first and second events to be uploaded indicating events to be uploaded, and a priority is set for each of the first and second events to be uploaded, determine whether there is an overlapping period in which at least a part of the first period overlaps with the second period between the first and second events to be uploaded;

when it is determined that overlapping period exists, the priority is compared between the first and second events to be uploaded;

when the priority of the first event to be uploaded is lower than that of the second event to be uploaded, exclude various data collected in the overlapping period from the data set for the first event to be uploaded; and execute processing to upload the data set to the external server, and perform control to wirelessly transmit the data set to the external server, without the excluded data;

wherein, in the upload processing of the data set, the processor is configured to:

compare the priority between the first and second events to be uploaded;

when the priority of the first event to be uploaded is equal to that of the second event to be uploaded, compare a time of an occurrence in these events; and when the time of the occurrence of the first event to be uploaded is prior to that of the second event to be uploaded, upload the data set for the first event to be uploaded prior to that of the data set for the second event to be uploaded, and perform control to wirelessly transmit the data set to the external server.

5. A method implemented in a vehicle, the vehicle comprising at least one sensor, the method comprising:

executing, by the at least one sensor, processing to acquire various data in a first period before time of an occurrence of a predetermined event and various data in a second period after time of the occurrence of the predetermined event while the vehicle is running;

creating a data set for uploading to an external server that manages the data acquired by the at least one sensor, wherein the predetermined event includes first and second events to be uploaded indicating events to be uploaded, and a priority is set for each of the first and second events to be uploaded, processing to determine whether there is an overlapping period in which at least a portion of the first period overlaps with the second period between the first and second events to be uploaded;

processing to compare the priority between the first and second events when it is determined that the overlapping period exists;

processing to exclude the various data collected in the overlapping period from the data set for the first event to be uploaded when the priority of the first event to be uploaded is lower than that of the second event to be uploaded;

processing to compare a time of an occurrence in these events when the priority of the first event to be uploaded is equal to that of the second event to be uploaded;

processing to exclude various data collected in the overlapping period from the data set for the first event to be uploaded when the time of the occurrence of the first event to be uploaded is prior to that of the second event to be uploaded; and processing to perform control to wirelessly transmit the data set to the external server, without the excluded data.

* * * * *